United States Patent [19]

Taylor

[11] Patent Number: 4,855,098

[45] Date of Patent: Aug. 8, 1989

[54] METHOD OF FORMING CANDLES AND CANDLE COMPOSITION THEREFOR

[76] Inventor: Ted Taylor, 160 Healdville Rd., Mt. Holly, Vt. 05758

[21] Appl. No.: 133,541

[22] Filed: Dec. 16, 1987

[51] Int. Cl.⁴ ...................... B29C 65/00; B29C 65/26; C10G 73/36

[52] U.S. Cl. ...................................... 264/103; 44/7.5; 106/270; 208/20; 208/21; 264/250; 264/259; 264/271.1; 264/330; 425/803; 431/288; 524/487; 524/488; 524/489

[58] Field of Search ............... 264/103, 250, 251, 259, 264/271.1, 279.1, 330, 245; 425/803; 44/7.5; 106/270; 208/20, 21; 431/288; 524/487, 488, 489

[56] References Cited

U.S. PATENT DOCUMENTS

| | | | |
|---|---|---|---|
| 941,083 | 11/1909 | Manbeck | 425/803 |
| 2,052,005 | 8/1936 | Root | 425/803 |
| 2,670,323 | 2/1954 | Hunter et al. | 208/21 |
| 2,697,926 | 12/1954 | Knox, Jr. | 431/288 |
| 2,825,635 | 3/1958 | Dooley et al. | 208/21 |
| 2,831,330 | 4/1958 | Walker | 44/7.5 X |
| 2,941,256 | 6/1960 | Stoerker | 431/288 X |
| 3,023,156 | 2/1962 | Podlipnik | 208/21 |
| 3,046,101 | 7/1962 | Tench | 44/7.5 |
| 3,216,921 | 11/1965 | Fox | 208/21 |
| 3,411,855 | 11/1968 | Olund | 44/7.5 X |
| 3,615,284 | 10/1971 | Cassar | 44/7.5 X |
| 3,630,697 | 12/1971 | Duling et al. | 44/7.5 |
| 3,660,336 | 5/1972 | Gonta et al. | 524/488 |
| 4,555,231 | 11/1985 | Kustka | 431/288 |

*Primary Examiner*—Jeffery Thurlow
*Assistant Examiner*—Leo B. Tentoni
*Attorney, Agent, or Firm*—Austin R. Miller

[57] ABSTRACT

A candle composition consisting essentially of about 10 to 90 volume percent of a first paraffin wax with a melting point of 120° to 125° F. and having a maximum of 2 percent oil, about 10 to 90 volume percent of the second paraffin wax with a melting point of 125° to 130° F. and having a maximum of 0.2 percent oil, and about 0.1 volume percent of stretchability enhancer and a method of forming a candle therefrom. A method of forming a candle comprising submerging a plurality of wax pieces consisting essentially of about 10 to 90 volume % paraffin wax with a melting point of 120° F. and having a maximum of 2.0% oil, about 10 to 90 volume % paraffin wax with a melting point of 125° to 130° F. and having a maximum of 0.2% oil and about 0.1 to 1.0 volume % of a stretchability enhancer in water having a temperature between about 100° and 120° F., permitting the pieces to soften in the water, removing the pieces from the water, joining the soft pieces together while the pieces are soft, and inserting wick material in between the joined soft pieces.

14 Claims, No Drawings

METHOD OF FORMING CANDLES AND CANDLE COMPOSITION THEREFOR

BACKGROUND OF THE INVENTION

The present invention relates to a method of forming candles and a candle composition therefor, particularly to a candle composition and method which facilitates formation of homemade multiple piece candles.

DESCRIPTION OF THE PRIOR ART

Many attempts have been made to provide wax compositions for candles and coating processes containing various physical characteristics. For example, U.S. Pat. No. 2,697,926 discloses a process for preparing candle wax having a melting point between about 120° to 150° F. which results in candles having reduced dripping tendencies during burning. U.S. Pat. No. 3,046,101 discloses a wax composition containing three wax components, each with spaced apart melting point ranges to improve burning qualities. U.S. Pat. No. 3,216,921 discloses a two component candle composition designed to improve layer adhesion during candle dipping processes. A candle composition having excellent burning characteristics is disclosed in U.S. Pat. No. 2,825,635. U.S. Pat. No. 3,411,855 discloses a candle having improved smoking characteristics which is composed of a blend of wax paraffin and polybutene.

U.S. Pat. No. 3,023,156 discloses a wax composition suitable for use as a coating material for paper-board containers. The composition consists of a blend of four waxes.

OBJECTS OF THE INVENTION

It is an object of the present invention to provide a candle composition capable of excellent burning characteristics which is easily softened to facilitate homemade forming of multiple piece candles.

It is another object of the present invention to provide a method of forming multiple piece candles from a wax composition which is easily performed at home by either adults or children in minutes and requires no special tools.

It is a further object to the present invention to provide a method in which individual wax blanks can be provided in the form of a kit and sold in kit form for use by persons inexperienced in the art of candlemaking.

Other objects and advantages of the present invention will become apparent to those skilled in the art from the description of preferred embodiments and the appended claims.

SUMMARY OF THE INVENTION

The present invention provides a candle composition consisting essentially of about 10 to 90 volume percent of a first paraffin wax with a melting point of 120° to 125° F. and having a maximum of 2.0 percent oil; about 10 to 90 volume percent of a second paraffin wax with a melting point of 125° to 130° F. and having a maximum of 0.2 percent oil; and about one volume percent of a stretchability enhancer.

The present invention further provides a method of forming a homemade candle, which includes submerging a plurality of wax pieces consisting essentially of about 10 to 90 volume percent paraffin wax with a melting point of 120° to 125° F. and having a maximum of 2.0 percent oil, about 10 to 90 volume percent paraffin wax with a melting point of 125° to 130° F. and having a maximum of 0.5 percent oil, and at least about one volume percent of a stretchability enhancer in water having a temperature between about 100° and 120° F. The pieces are permitted to soften in the water and then are removed from the water. They are then shaped into a desired form and wick material is inserted into the pieces while they remain soft to finish forming a homemade candle.

DESCRIPTION OF PREFERRED EMBODIMENTS

It has been discovered for the first time that homemade multiple piece candles having excellent burn characteristics may easily be formed in accordance with the wax composition and method of the invention.

To form a homemade candle it is highly desirable to provide a method which is safe for both adults and children. This calls for temperatures which remain as low as possible, yet are high enough to soften the wax composition for forming and shaping. Preferably, use of open flame is avoided. It is further desirable to permit direct handling of the wax and candle so that the candles may be manually shaped. It is also desirable to produce candles capable of having excellent burning characteristics. Such characteristics include excellent burning time, reduced smoking during burning and reduced dripping of melted wax during burning.

Candles formed in accordance with the composition and method of the invention are formed from a blend of the following components: semi-refined paraffin having a melting point of about 120° to 125° F. with a maximum of 2.0% oil. This component imparts the required softness and low temperature meltability needed for hand shaping. The composition most preferably has a melting point of about 121° F., a maximum of 1.5% oil and contains about 50% of this first component. The second is a fully refined wax paraffin having a melting point of 125° to 130° F. with a maximum of 0.5% oil. This component provides a counterbalancing slightly higher melting point as well as strength to resist undue bending. The composition most preferably has a melting point of about 127° F., a maximum of 0.2% oil and contains about 50% of this second component.

The third component is a stretchability enhancer and most preferably consists of either a highly branched, high molecular weight polyolefin polymer having a melting point of about 125° to 165° F. or a microcrystalline wax having a melting point of about 120° to 130° F. The preferred polymer is VYBAR 260 (manufactured by Petrolite Corporation of Tulsa, OK), for example. This third component provides stretchability and suspends the oils from the other components to prevent an oily feeling on the formed candle. While it is possible to employ only about 0.1 volume percent, addition of only about 0.5 to 1.0 volume percent of the third component is preferred, with about 1.0 volume percent being most preferred. It is possible to include more than one volume percent, but it has been found to be unnecessary in that it does not further improve the component mixture.

A kit may be assembled for utilizing the method of the invention. Preferably, the kit includes a plurality of disks or blanks formed from the composition of the invention, most preferably five of such blanks. Each blank is preferably dyed in different colors in order to produce candles of varying colors. The kit further preferably includes a prewaxed wick and a slender cylindrical wick insertion rod used to facilitate placement of the wicking material within a formed candle. Additional small pieces of wax are most preferably added to the kit, such as white and/or black wax to facilitate formation of eyes, noses, ears, or the like when forming candles in the shapes of persons or animals. The kit further preferably includes a knife to assist in cutting the wax blanks.

In accordance with the method of the invention, pieces of wax having the above cited component blend are obtained. Pieces of the wax composition are immersed in water having a temperature between about 100° and 120° F.

The pieces are permitted to soften, preferably for about two to five minutes. Then they are removed from the water in a pliable, soft state to facilitate hand shaping of a multiple piece candle. Wick material is inserted between pieces to complete a homemade, hand formed candle.

A method of forming a preferred braid type candle in accordance with the invention utilizing the above wax composition includes performing the following steps. A container is filled with water preferably having a temperature of about 115° F. so as to be able to submerge wax pieces or pre-cut pieces to make them pliable or soft. The wax composition tends to melt, rather than soften if the water temperature is above about 120° F. and will not soften sufficiently if the water temperature is below about 100° F. One piece of the wax composition is placed in the water container. It should soften in two to five minutes and there should be no discomfort in handling it. The piece is then taken out of the water and laid on a flat surface and cut into three pieces. Then, the remaining two pieces are put back in water to keep them warm and soft. The first piece is gently rolled on paper towelling to remove excess moisture.

On a flat surface, the towelled, dried piece is rolled into a 10 or 12 inch cylinder length, making sure that the thickness is even from end to end. The drying and rolling process is repeated with the remaining two pieces.

The cylindrical logs are laid side by side, and at only one end, the tops are pinched together and then braided down to the other ends. The completed braid is folded in half. With one hand, the folded braid is gently squeezed together. Downward pressure is applied with the palm of the other hand.

While the partly formed candle is still warm, a wick is placed directly over and on the top of the candle. The flat, sharpened edge of a metal wick insertion rod is pushed downwardly along with the wick, straight down through the center of the candle until it comes out the bottom. At the bottom of the candle, the wick is optionally tied in a knot and pressed back into the bottom of the candle. This prevents the wick from pulling back out. At the top of the candle the wick is cut off leaving about one inch above for burning.

The following table includes examples of candles having variations in proportions of components in the wax composition and variation in forming conditions from the method. It is possible that these variations can effect the various burning characteristics as well as ease of candle formation and shaping as indicated below.

| Component | Melting Point °F. | Max % Oil | Volume % | Softness | Stretchability & Moldability | Oil Consistency |
|---|---|---|---|---|---|---|
| 1 | 121 | 2.0 | 0 | | | |
| 2 | 127 | .2 | 99 | 4 | 4 | 4 |
| 3 | 127 | — | 1 | | | |
| 1 | 121 | 2.0 | 5 | | | |
| 2 | 127 | .2 | 94 | 4 | 4 | 4 |
| 3 | 127 | — | 1 | | | |
| 1 | 121 | 2.0 | 10 | | | |
| 2 | 127 | .2 | 89 | 2 | 2 | 2 |
| 3 | 127 | — | 1 | | | |
| 1 | 121 | 2.0 | 49.5 | | | |
| 2 | 127 | .2 | 49.5 | 1 | 1 | 1 |
| 3 | 127 | — | 1 | | | |
| 1 | 121 | 2.0 | 89 | | | |
| 2 | 127 | .2 | 10 | 2 | 2 | 2 |
| 3 | 127 | — | 1 | | | |
| 1 | 121 | 2.0 | 94 | | | |
| 2 | 127 | .2 | 5 | 4 | 4 | 4 |
| 3 | 127 | — | 1 | | | |
| 1 | 121 | 2.0 | 99 | | | |
| 2 | 127 | .2 | 0 | 4 | 4 | 4 |
| 3 | 127 | — | 1 | | | |
| 1 | 121 | 2.0 | 0 | | | |
| 2 | 127 | .2 | 99 | | | |
| 4 | 162 | — | 1 | 4 | 4 | 4 |
| 1 | 121 | 2.0 | 5 | | | |
| 2 | 127 | .2 | 94 | 4 | 4 | 4 |
| 4 | 162 | — | 1 | | | |
| 1 | 121 | 2.0 | 10 | | | |
| 2 | 127 | .2 | 89 | 2 | 2 | 2 |
| 4 | 162 | — | 1 | | | |
| 1 | 121 | 2.0 | 49.5 | | | |
| 2 | 127 | .2 | 49.5 | 1 | 1 | 1 |
| 4 | 162 | | 1 | | | |
| 1 | 121 | 2.0 | 89 | | | |
| 2 | 127 | .2 | 10 | 2 | 2 | 2 |
| 4 | 162 | — | 1 | | | |
| 1 | 121 | 2.0 | 94 | | | |
| 2 | 127 | .2 | 5 | 4 | 4 | 4 |
| 4 | 162 | | 1 | | | |
| 1 | 121 | 2.0 | 99 | | | |
| 2 | 127 | .2 | 0 | 4 | 4 | 4 |
| 4 | 162 | — | 1 | | | |

-continued

| Component | Melting Point °F. | Max % Oil | Volume % | Softness | Stretchability & Moldability | Oil Consistency |
|---|---|---|---|---|---|---|
| 1 | 121 | 2.0 | 0 | | | |
| 2 | 127 | .2 | 99 | 4 | 4 | 4 |
| 5 | 165–175 | .5 | 1 | | | |
| 1 | 121 | 2.0 | 5 | | | |
| 2 | 127 | .2 | 94 | 4 | 4 | 4 |
| 5 | 165–175 | .5 | 1 | | | |
| 1 | 121 | 2.0 | 10 | | | |
| 2 | 127 | .2 | 89 | 2 | 2 | 2 |
| 5 | 165–175 | .5 | 1 | | | |
| 1 | 121 | 2.0 | 49.5 | | | |
| 2 | 127 | .2 | 49.5 | 1 | 1 | 1 |
| 5 | 165–175 | .5 | 1 | | | |
| 1 | 121 | 2.0 | 89 | | | |
| 2 | 127 | .2 | 10 | 2 | 2 | 2 |
| 5 | 165–175 | .5 | 1 | | | |
| 1 | 121 | 2.0 | 94 | | | |
| 2 | 127 | .2 | 5 | 4 | 4 | 4 |
| 5 | 165–175 | .5 | 1 | | | |
| 1 | 121 | 2.0 | 99 | | | |
| 2 | 127 | .2 | 0 | 4 | 4 | 4 |
| 5 | 165–175 | .5 | 1 | | | |
| 1 | 121 | 2.0 | 0 | | | |
| 2 | 127 | .2 | 99 | 4 | 4 | 4 |
| 6 | 170–180 | .5 | 1 | | | |
| 1 | 121 | 2.0 | 5 | | | |
| 2 | 127 | .2 | 94 | 4 | 4 | 4 |
| 6 | 170–180 | .5 | 0 | | | |
| 1 | 121 | 2.0 | 10 | | | |
| 2 | 127 | .2 | 89 | 2 | 2 | 2 |
| 6 | 170–180 | .5 | 1 | | | |
| 1 | 121 | 2.0 | 49.5 | | | |
| 2 | 127 | .2 | 49.5 | 1 | 1 | 1 |
| 6 | 170–180 | .5 | 1 | | | |
| 1 | 121 | 2.0 | 89 | | | |
| 2 | 127 | .2 | 10 | | | |
| 6 | 170–180 | .5 | 1 | | | |
| 1 | 121 | 2.0 | 94 | | | |
| 2 | 127 | .2 | 5 | 4 | 4 | 4 |
| 6 | 170–180 | .5 | 1 | | | |
| 1 | 121 | 2.0 | 99 | | | |
| 2 | 127 | .2 | 0 | 4 | 4 | 4 |
| 6 | 170–180 | .5 | 1 | | | |
| 1 | 121 | 2.0 | 0 | | | |
| 2 | 127 | .2 | 99 | 4 | 4 | 4 |
| 7 | 130 | .3 | 1 | | | |
| 1 | 121 | 2.0 | 5 | | | |
| 2 | 127 | .2 | 94 | 4 | 4 | 4 |
| 7 | 130 | .3 | 1 | | | |
| 1 | 121 | 2.0 | 10 | | | |
| 2 | 127 | .2 | 89 | 4 | 4 | 4 |
| 7 | 130 | .3 | 1 | | | |
| 1 | 121 | 2.0 | 49.5 | | | |
| 2 | 127 | .2 | 49.5 | 4 | 4 | 4 |
| 7 | 130 | .3 | 1 | | | |
| 1 | 121 | 2.0 | 89 | | | |
| 2 | 127 | .2 | 10 | 4 | 4 | 4 |
| 7 | 130 | .3 | 1 | | | |
| 1 | 121 | 2.0 | 94 | | | |
| 2 | 127 | .2 | 5 | 4 | 4 | 4 |
| 7 | 130 | .3 | 1 | | | |
| 1 | 121 | 2.0 | 99 | | | |
| 2 | 127 | .2 | 0 | 4 | 4 | 4 |
| 7 | 130 | .3 | 1 | | | |
| 8 | 140 | 2.0 | 0 | | | |
| 2 | 127 | .2 | 99 | 4 | 4 | 3 |
| 3 | 127 | — | 1 | | | |
| 8 | 140 | 2.0 | 5 | | | |
| 2 | 127 | .2 | 94 | 4 | 4 | 3 |
| 3 | 127 | — | 1 | | | |
| 8 | 140 | 2.0 | 10 | | | |
| 2 | 127 | .2 | 89 | 4 | 4 | 3 |
| 3 | 127 | — | 1 | | | |
| 8 | 140 | 2.0 | 49.5 | | | |
| 2 | 127 | .2 | 49.5 | 4 | 4 | 3 |
| 3 | 127 | — | 1 | | | |
| 8 | 140 | 2.0 | 89 | | | |
| 2 | 127 | .2 | 10 | 4 | 4 | 3 |
| 3 | 127 | — | 1 | | | |
| 8 | 140 | 2.0 | 94 | | | |
| 2 | 127 | .2 | 5 | 4 | 4 | 3 |

-continued

| Component | Melting Point °F. | Max % Oil | Volume % | Softness | Stretchability & Moldability | Oil Consistency |
|---|---|---|---|---|---|---|
| 3 | 127 | — | 1 | | | |
| 8 | 140 | 2.0 | 99 | | | |
| 2 | 127 | .2 | 0 | 4 | 4 | 3 |
| 3 | 127 | — | 1 | | | |
| 9 | 150 | 2.0 | 0 | | | |
| 2 | 127 | .2 | 99 | 4 | 4 | 3 |
| 3 | 127 | — | 1 | | | |
| 9 | 150 | 2.0 | 5 | | | |
| 2 | 127 | .2 | 94 | 4 | 4 | 3 |
| 3 | 127 | — | 1 | | | |
| 9 | 150 | 2.0 | 10 | | | |
| 2 | 127 | .2 | 89 | 4 | 4 | 3 |
| 3 | 127 | — | 1 | | | |
| 9 | 150 | 2.0 | 49.5 | | | |
| 2 | 127 | .2 | 49.5 | 4 | 4 | 3 |
| 3 | 127 | — | 1 | | | |
| 9 | 150 | 2.0 | 89 | | | |
| 2 | 127 | .2 | 10 | 4 | 4 | 3 |
| 3 | 127 | — | 1 | | | |
| 9 | 150 | 2.0 | 94 | | | |
| 2 | 127 | .2 | 5 | 4 | 4 | 3 |
| 3 | 127 | — | 1 | | | |
| 9 | 150 | 2.0 | 99 | | | |
| 2 | 127 | .2 | 0 | 4 | 4 | 3 |
| 3 | 127 | — | 1 | | | |
| 1 | 121 | 2.0 | 0 | | | |
| 10 | 140 | .2 | 99 | 4 | 4 | 3 |
| 3 | 127 | — | 1 | | | |
| 1 | 121 | 2.0 | 5 | | | |
| 10 | 140 | .2 | 94 | 4 | 4 | 3 |
| 3 | 127 | — | 1 | | | |
| 1 | 121 | 2.0 | 10 | | | |
| 10 | 140 | .2 | 89 | 4 | 4 | 3 |
| 3 | 127 | — | 1 | | | |
| 1 | 121 | 2.0 | 49.5 | | | |
| 10 | 140 | .2 | 49.5 | 4 | 4 | 3 |
| 3 | 127 | — | 1 | | | |
| 1 | 121 | 2.0 | 89 | | | |
| 10 | 140 | .2 | 10 | 4 | 4 | 3 |
| 3 | 127 | — | 1 | | | |
| 1 | 121 | 2.0 | 94 | | | |
| 10 | 140 | .2 | 5 | 4 | 4 | 3 |
| 3 | 127 | — | 1 | | | |
| 1 | 121 | 2.0 | 99 | | | |
| 10 | 140 | .2 | 0 | 4 | 4 | 3 |
| 3 | 127 | — | 1 | | | |
| 1 | 121 | 2.0 | 0 | | | |
| 11 | 150 | .2 | 99 | 4 | 4 | 3 |
| 3 | 127 | — | 1 | | | |
| 1 | 121 | 2.0 | 5 | | | |
| 11 | 150 | .2 | 94 | 4 | 4 | 3 |
| 3 | 127 | — | 1 | | | |
| 1 | 121 | 2.0 | 10 | | | |
| 11 | 150 | .2 | 89 | 4 | 4 | 3 |
| 3 | 127 | — | 1 | | | |
| 1 | 121 | 2.0 | 49.5 | 4 | 4 | 3 |
| 11 | 150 | .2 | 49.5 | | | |
| 3 | 127 | — | | | | |
| 1 | 121 | 2.0 | 89 | | | |
| 11 | 150 | .2 | 10 | 4 | 4 | 3 |
| 3 | 127 | — | 1 | | | |
| 1 | 121 | 2.0 | 94 | | | |
| 11 | 150 | .2 | 5 | 4 | 4 | 3 |
| 3 | 127 | — | 1 | | | |
| 1 | 121 | 2.0 | 99 | 4 | 4 | 3 |
| 11 | 150 | .2 | 0 | | | |
| 3 | 127 | — | 1 | | | |
| 12 | 110 | 2.0 | 0 | | | |
| 2 | 127 | .2 | 99 | 4 | 4 | 3 |
| 3 | 127 | — | 1 | | | |
| 12 | 110 | 2.0 | 5 | | | |
| 2 | 127 | .2 | 94 | 4 | 4 | 3 |
| 3 | 127 | — | 1 | | | |
| 12 | 110 | 2.0 | 10 | | | |
| 2 | 127 | .2 | 89 | 4 | 4 | 3 |
| 3 | 127 | — | 1 | | | |
| 12 | 110 | 2.0 | 49.5 | | | |
| 2 | 127 | .2 | 49.5 | 4 | 4 | 3 |
| 3 | 127 | — | 1 | | | |
| 12 | 110 | 2.0 | 89 | | | |

-continued

| Component | Melting Point °F. | Max % Oil | Volume % | Softness | Stretchability & Moldability | Oil Consistency |
|---|---|---|---|---|---|---|
| 2 | 127 | .2 | 10 | 4 | 4 | 3 |
| 3 | 127 | — | 1 | | | |
| 12 | 110 | 2.0 | 94 | | | |
| 2 | 127 | .2 | 5 | 4 | 4 | 3 |
| 3 | 127 | — | 1 | | | |
| 12 | 110 | 2.0 | 99 | | | |
| 2 | 127 | .2 | 0 | 4 | 4 | 3 |
| 3 | 127 | — | 1 | | | |
| 1 | 121 | 2.0 | 0 | | | |
| 13 | 115 | .2 | 99 | 4 | 4 | 3 |
| 3 | 127 | — | 1 | | | |
| 1 | 121 | 2.0 | 5 | | | |
| 13 | 115 | .2 | 94 | 4 | 4 | 3 |
| 3 | 127 | — | 1 | | | |
| 1 | 121 | 2.0 | 10 | | | |
| 13 | 115 | .2 | 89 | 4 | 4 | 3 |
| 3 | 127 | — | 1 | | | |
| 1 | 121 | 2.0 | 49.5 | | | |
| 13 | 115 | .2 | 49.5 | 4 | 4 | 3 |
| 3 | 127 | — | 1 | | | |
| 1 | 121 | 2.0 | 89 | | | |
| 13 | 115 | .2 | 10 | 4 | 4 | 3 |
| 3 | 127 | — | 1 | | | |
| 1 | 121 | 2.0 | 94 | | | |
| 13 | 115 | .2 | 5 | 4 | 4 | 3 |
| 3 | 127 | — | 1 | | | |
| 1 | 121 | 2.0 | 99 | | | |
| 13 | 115 | .2 | 0 | 4 | 4 | 3 |
| 3 | 127 | — | 1 | | | |
| 14 | 121 | 2.5 | 0 | | | |
| 2 | 127 | .2 | 99 | 4 | 4 | 4 |
| 3 | 127 | — | 1 | | | |
| 14 | 121 | 2.5 | 5 | | | |
| 2 | 127 | .2 | 94 | 4 | 4 | 4 |
| 3 | 127 | — | 1 | | | |
| 14 | 121 | 2.5 | 10 | | | |
| 2 | 127 | .2 | 89 | 4 | 4 | 4 |
| 3 | 127 | — | 1 | | | |
| 14 | 121 | 2.5 | 49.5 | | | |
| 2 | 127 | .2 | 49.5 | 4 | 4 | 4 |
| 3 | 127 | — | 1 | | | |
| 14 | 121 | 2.5 | 89 | | | |
| 2 | 127 | .2 | 10 | 4 | 4 | 4 |
| 3 | 127 | — | 1 | | | |
| 14 | 121 | 2.5 | 94 | | | |
| 2 | 127 | .2 | 5 | 4 | 4 | 4 |
| 3 | 127 | — | 1 | | | |
| 14 | 121 | 2.5 | 99 | | | |
| 2 | 127 | .2 | 0 | 4 | 4 | 4 |
| 3 | 127 | — | 1 | | | |
| 15 | 121 | 3.0 | 0 | | | |
| 2 | 127 | .2 | 99 | 4 | 4 | 4 |
| 3 | 127 | — | 1 | | | |
| 15 | 121 | 3.0 | 5 | | | |
| 2 | 127 | .2 | 94 | 4 | 4 | 4 |
| 3 | 127 | — | 1 | | | |
| 15 | 121 | 3.0 | 10 | | | |
| 2 | 127 | .2 | 89 | 4 | 4 | 4 |
| 3 | 127 | — | 1 | | | |
| 15 | 121 | 3.0 | 49.5 | | | |
| 2 | 127 | .2 | 49.5 | 4 | 4 | 4 |
| 3 | 127 | — | 1 | | | |
| 15 | 121 | 3.0 | 89 | | | |
| 2 | 127 | .2 | 10 | 4 | 4 | 4 |
| 3 | 127 | — | 1 | | | |
| 15 | 121 | 3.0 | 94 | | | |
| 2 | 127 | .2 | 5 | 4 | 4 | 4 |
| 3 | 127 | — | 1 | | | |
| 15 | 121 | 3.0 | 99 | | | |
| 2 | 127 | .2 | 0 | 4 | 4 | 4 |
| 3 | 127 | — | 1 | | | |
| 1 | 121 | 2.0 | 0 | | | |
| 16 | 127 | 1.0 | 99 | 4 | 4 | 4 |
| 3 | 127 | — | 1 | | | |
| 1 | 121 | 2.0 | 5 | | | |
| 16 | 127 | 1.0 | 94 | 4 | 4 | 4 |
| 3 | 127 | — | 1 | | | |
| 1 | 121 | 2.0 | 10 | | | |
| 16 | 127 | 1.0 | 89 | 4 | 4 | 4 |
| 3 | 127 | — | 1 | | | |

-continued

| Component | Melting Point °F. | Max % Oil | Volume % | Softness | Stretchability & Moldability | Oil Consistency |
|---|---|---|---|---|---|---|
| 1 | 121 | 2.0 | 49.5 | | | |
| 16 | 127 | 1.0 | 49.5 | 4 | 4 | 4 |
| 3 | 127 | — | 1 | | | |
| 1 | 121 | 2.0 | 89 | | | |
| 16 | 127 | 1.0 | 10 | 4 | 4 | 4 |
| 3 | 127 | — | 1 | | | |
| 1 | 121 | 2.0 | 94 | | | |
| 16 | 127 | 1.0 | 5 | 4 | 4 | 4 |
| 3 | 127 | — | 1 | | | |
| 1 | 121 | 2.0 | 99 | | | |
| 16 | 127 | 1.0 | 0 | 4 | 4 | 4 |
| 3 | 127 | — | 1 | | | |

Components
1 = Semi-refined wax
2 = Fully-refined wax
3 = Highly branched, high molecular weight polyolefin
4 = Highly branched, high molecular weight polyolefin
5 = Microcrystalline wax
6 = Microcrystalline wax
7 = Semi-refined wax
8 = Semi-refined wax
9 = Semi-refined wax
10 = Fully-refined wax
11 = Fully-refined wax
12 = Semi-refined wax
13 = Fully-refined wax
14 = Semi-refined wax
15 = Semi-refined wax
16 = Fully-refined wax
Softness, Stretchability and Moldability and Oil Consistency Rating
1 = Excellent
2 = Good
3 = Satisfactory
4 = Poor

I claim:

1. A candle composition consisting essentially of about 10 to 90 volume percent of a first paraffin wax with a melting point of 120° to 125° F. and having a maximum of 2.0 percent oil; about 10 to 90 volume percent of a second paraffin wax with a melting point of 125° to 130° F. and having a maximum of 0.5 percent oil; and about 0.1 to 1.0 volume percent of a stretchability enhancer.

2. A candle composition as defined in claim 1 containing about 50 volume percent of said first wax.

3. A candle composition as defined in claim 1 containing about 50 volume percent of said second wax.

4. In a method of forming a candle, the steps comprising:

submerging a plurality of wax pieces consisting essentially of about 10 to 90 volume percent paraffin wax with a melting point of 120° F. and having a maximum of 2.0 percent oil, about 10 to 90 volume percent paraffin wax with a melting point of 125° to 130° F. and having a maximum of 0.2 percent oil and about 0.1 to 1.0 volume percent of a stretchability enhancer in water having a temperature between about 100° and 120° F.;

permitting said pieces to soften in said water;

removing said pieces from said water;

joining said soft pieces together while said pieces are soft; and inserting wick material in between said joined soft pieces.

5. The method as defined in claim 4 further comprising joining together at least three of said pieces and inserting said wick material therebetween.

6. The method as defined in claim 5 wherein said pieces are longitudinally elongated and are braided together.

7. The candle composition as defined in claim 1 wherein said stretchability enhancer is a highly branched, high molecular weight polymeric material having a melting point between about 125° to 165° F.

8. The candle composition as defined in claim 1 wherein said stretchability enhancer is a micro-crystalline wax having a melting point of between about 120° to 130° F.

9. The candle composition as defined in claim 1 wherein said first wax has a melting point of about 121° F.

10. The candle composition as defined in claim 1 wherein said second wax has a melting point of about 127° F.

11. The candle composition as defined in claim 1 wherein said first wax has a maximum of 1.5 percent oil.

12. The candle composition as defined in claim 1 wherein said second wax has a maximum of 0.2 percent oil.

13. The candle composition as defined in claim 1 wherein about 1.0 volume percent of said stretchability enhancer is added.

14. The method as defined in claim 4 wherein the water has a temperature between about 100° and 120° F.

* * * * *